(12) United States Patent  
Tsujiuchi et al.

(10) Patent No.: US 8,501,130 B1  
(45) Date of Patent: Aug. 6, 2013

(54) CARBON DIOXIDE RECOVERY SYSTEM AND METHOD

(71) Applicant: Mitsubishi Heavy Industries, Ltd., Tokyo (JP)

(72) Inventors: Tatsuya Tsujiuchi, New York, NY (US); Shintaro Honjo, New York, NY (US); Takahito Yonekawa, New York, NY (US); Satoru Sugita, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/625,149

(22) Filed: Sep. 24, 2012

(51) Int. Cl.
*B01D 53/14* (2006.01)
*B01D 53/30* (2006.01)
*B01D 53/62* (2006.01)
*B01D 53/75* (2006.01)
*B01D 53/78* (2006.01)
*G01N 31/22* (2006.01)

(52) U.S. Cl.
USPC ........... 423/220; 423/228; 422/108; 422/119; 422/168; 422/169; 422/170; 96/234; 96/355; 95/236

(58) Field of Classification Search
USPC ......... 423/220, 228; 422/108, 119, 168–170; 96/234, 355; 95/236
See application file for complete search history.

(56) References Cited

U.S. PATENT DOCUMENTS

| | | | | |
|---|---|---|---|---|
| 6,117,404 A | * | 9/2000 | Mimura et al. | 423/228 |
| 6,784,320 B2 | * | 8/2004 | Mimura et al. | 564/497 |
| 7,601,315 B2 | * | 10/2009 | Ouimet | 423/228 |

FOREIGN PATENT DOCUMENTS

| | | |
|---|---|---|
| JP | 2008-126154 A | 6/2008 |
| JP | 2010-202426 A | 9/2010 |
| JP | 2010-241630 A | 10/2010 |
| JP | 2011-115724 A | 6/2011 |

* cited by examiner

*Primary Examiner* — Timothy Vanoy
(74) *Attorney, Agent, or Firm* — Westerman, Hattori, Daniels & Adrian, LLP

(57) ABSTRACT

A method for recovering $CO_2$ from gas to be processed containing $CO_2$, includes bringing the gas to be processed containing $CO_2$ and $CO_2$ absorbent into contact with each other to absorb and remove $CO_2$ from the gas to be processed; cleaning the treated gas from which $CO_2$ has been removed with washing fluid at least once; heating the absorbent which has absorbed $CO_2$, separating and removing $CO_2$ gas from the absorbent and regenerating the absorbent; cooling the separated $CO_2$ gas to condense moisture contained in the gas to obtain condensed water; and monitoring changes in concentration of the $CO_2$ absorbent contained in the condensed water and depending on the value of the measured concentration, controlling supply of the condensed water so that the condensed water is reused as a part of the washing fluid or a part of the $CO_2$ absorbent.

12 Claims, 4 Drawing Sheets

CARBON DIOXIDE RECOVERY SYSTEM AND METHOD

BACKGROUND OF THE INVENTION

The present invention relates to a system configured to recover carbon dioxide ($CO_2$) and a method for recovering $CO_2$.

The greenhouse effect due to $CO_2$ has been regarded as one of the causes of global warming. Accordingly, much research and development has been carried out on technologies for preventing or suppressing release of $CO_2$ into the atmosphere. Because $CO_2$ is generated mainly by combustion of fossil fuels, it is desired that exhaust gas generated by the combustion of fossil fuel be emitted into the atmosphere after $CO_2$ contained in the gas is appropriately reduced or removed therefrom.

Japanese Patent Application Publication No. 2011-115724 discloses a system including: a $CO_2$ absorption apparatus configured to absorb and remove $CO_2$ contained in exhaust gas from combustion of fossil fuel by bringing the exhaust gas into contact with $CO_2$ absorbent such as basic amine compound; a regeneration apparatus configured to regenerate an absorbent which has absorbed $CO_2$; and a recovery apparatus configured to recover $CO_2$ separated from the absorbent by the regeneration apparatus. This patent literature also discusses provision of a plurality of washing units configured to clean treated gas by removing $CO_2$ with washing fluid. Furthermore, according to the above literature, the washing fluid is circulated at each washing unit, and by measuring the concentration of basic amine compound contained in the gas after washing, the circulation rate of washing fluid is adjusted to an appropriate level for collecting the basic amine compound.

SUMMARY OF THE INVENTION

In a $CO_2$ absorption apparatus having such a configuration, the concentration of basic amine compound which is a principal component of $CO_2$ absorbent accompanied by exhaust gas is demanded to be reduced as much as possible. Consequently, a large amount of washing fluid is used at a plurality of washing units. The washing fluid used in the washing units is circulated. In addition to this idea, the inventor of the present invention has considered use of condensed water of $CO_2$ gas discharged from a regeneration apparatus. However, when an operating condition of the regeneration apparatus is unstable like at a startup time of the system or at a shut down of the system, the concentration of basic amine compound in condensed water changes. Thus, if condensed water containing the basic amine compound at a high concentration is supplied to washing units of the $CO_2$ absorption apparatus, its washing effect is reduced, so that an amount of basic amine compound accompanied by exhausted gas is increased, which is a problem which the present invention intends to solve.

Accordingly, the present invention is directed to providing a $CO_2$ recovery system and a method therefore, capable of, even when condensed water of $CO_2$ gas exhausted from a regeneration apparatus for $CO_2$ absorbent liquid is used as a washing fluid in the washing units of the $CO_2$ absorption apparatus, preventing the amount of basic amine compound accompanied by gas exhausted from the $CO_2$ absorption apparatus from being increased According to an aspect of the present invention, a system for recovering $CO_2$ from gas to be processed containing $CO_2$, comprises: a $CO_2$ absorption apparatus having an absorption unit which brings the gas to be processed containing $CO_2$ into contact with $CO_2$ absorbent to absorb and remove $CO_2$ from the gas to be processed; a regeneration apparatus configured to heat the absorbent that has absorbed $CO_2$, separates and removes $CO_2$ from the absorbent, exhausts $CO_2$ and regenerates the absorbent; a condensation apparatus configured to cool $CO_2$ gas exhausted from the regeneration apparatus to condense moisture in the gas; and a condensed water distribution apparatus configured to monitor changes in concentration of the $CO_2$ absorbent in the condensed water obtained by the condensation apparatus and depending on the value of a measured concentration, supply the condensed water as a part of washing fluid of the washing unit in the $CO_2$ absorption apparatus or a part of the $CO_2$ absorbent of the absorption unit. As an analyzer for monitoring changes in concentration of the $CO_2$ absorbent in the condensed water, a pH meter, an electric conductivity meter, or resistivity meter may be used.

The $CO_2$ absorption apparatus may contain a plurality of the washing units arranged in series for the treated gas from which $CO_2$ has been removed by the absorption unit. The condensed water distribution apparatus may be constructed to, when the measured pH value is higher than a first threshold, supply condensed water to a washing unit located upstream with respect to a flow of the treated gas, of the plurality of the washing units, and when the measured value is lower than the first threshold, supply condensed water to the washing unit located downstream. The condensed water distribution apparatus may be constructed to, when the measured value is higher than a first threshold and a second threshold, supply condensed water to the absorption unit, and when the measured value is higher than the first threshold and lower than the second threshold, supply condensed water to a washing unit located upstream with respect to a flow of the treated gas, of the plurality of the washing units, and when the measured value is lower than the first threshold and the second threshold, supply condensed water to a washing unit located downstream.

According to another aspect of the present invention, a method for recovering $CO_2$ from gas to be processed containing $CO_2$, comprises: a step of bringing the gas to be processed containing $CO_2$ and $CO_2$ absorbent into contact with each other to absorb and remove $CO_2$ from the gas to be processed; a step of washing the processed gas from which $CO_2$ has been removed with washing fluid at least once; a step of heating the absorbent which has absorbed $CO_2$, separating and removing $CO_2$ gas from the absorbent and regenerating the absorbent; a step of cooling the separated $CO_2$ gas to condense moisture contained in the gas to obtain condensed water; and a step of monitoring a concentration of the $CO_2$ absorbent contained in the condensed water and depending on the value of the measured concentration, controlling supply of the condensed water so that the condensed water is reused as a part of the washing fluid or a part of the $CO_2$ absorbent. To monitor changes in concentration of the $CO_2$ absorbent in the condensed water, it is permissible to measure pH, electric conductivity, or resistivity of the condensed water.

The step of washing the process gas may include cleaning the treated gas with washing fluid multiple times. In this case, the control step may include, when the measured pH value is higher than the first threshold, supplying condensed water so that the condensed water is reused as a part of washing fluid for washing on an upstream side (i.e., initial washing) with respect to the flow of the treated gas of the plurality of the washings, and when the measured pH value is lower than the first threshold, supplying the condensed water so that the condensed water is reused as a part of washing fluid for washing on a downstream side (i.e., second washing). Alternatively, the control step may include: when the measured value is higher than the first threshold and the second threshold, supplying the condensed water so that the condensed water is reused as a part of the absorbent; when the measured value is higher than the first threshold and lower than the second threshold, supplying the condensed water so that the condensed water is reused as a part of washing fluid for washing on an upstream side with respect to the flow of the treated gas of the plurality of the washing; and when the measured value is lower than the first and second thresholds, supplying the condensed water as a part of the washing fluid for the second washing.

DESCRIPTION OF THE PREFERRED EMBODIMENTS

Hereinafter, an exemplary embodiment of a $CO_2$ recovery system and method therefor according to the present invention will be described with reference to the accompanying drawings.

Figure 1:
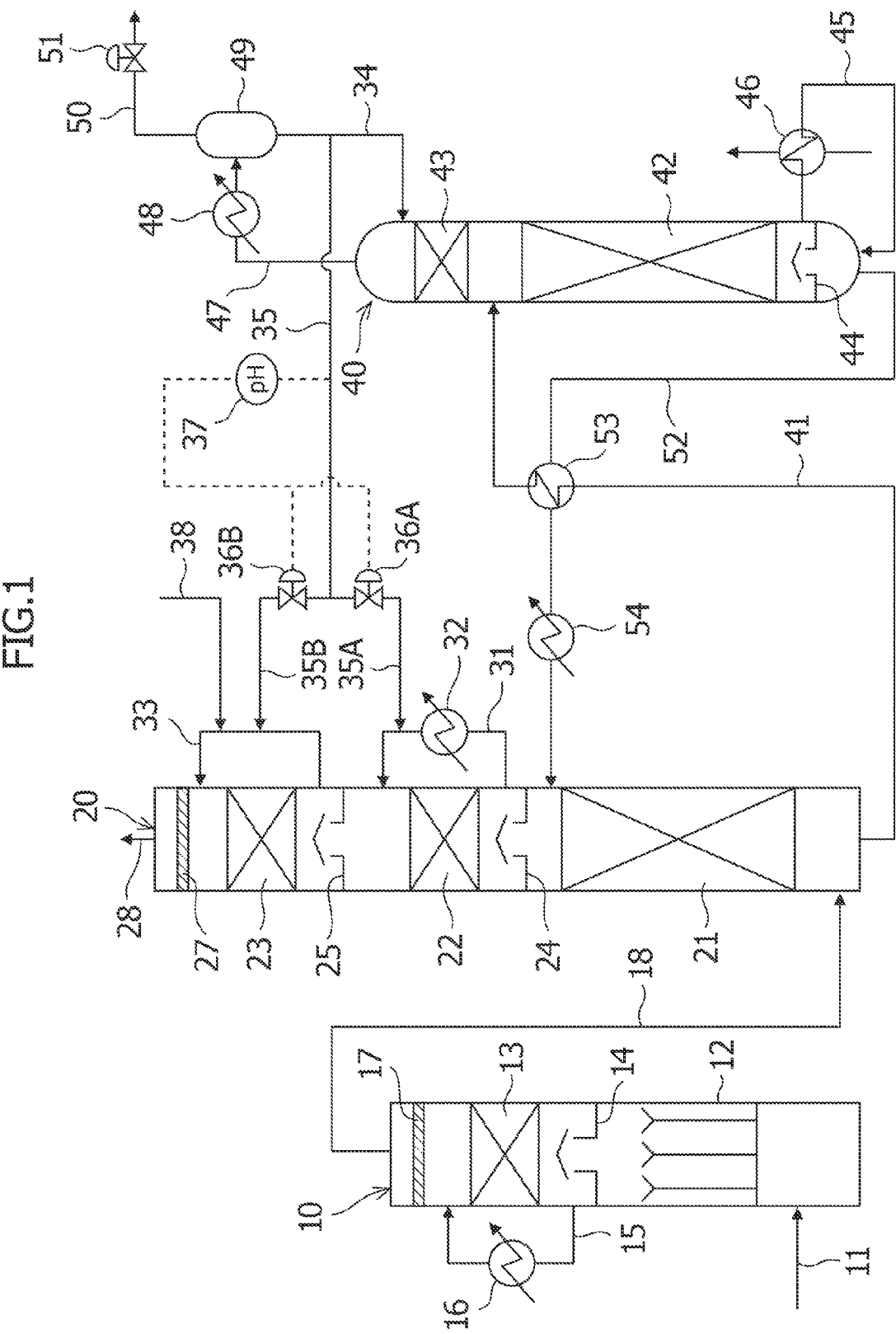
FIG. 1 is a diagram schematically illustrating a $CO_2$ recovery system according to an exemplary embodiment of the present invention.

Referring to FIG. 1, a $CO_2$ recovery system according to the present exemplary embodiment includes, as main components thereof, a desulfurization tower 10 configured to remove sulfur oxide from gas to be processed containing the sulfur oxide and carbon dioxide, such as combustion exhaust gas of fossil fuel, a $CO_2$ absorption tower 20 configured to remove $CO_2$ from the desulfurization gas from which sulfur oxide has been removed by the desulfurization tower, using $CO_2$ absorbent, and a regeneration tower 40 configured to desorb $CO_2$ from the $CO_2$ absorbent which has absorbed $CO_2$ (hereinafter referred to as "rich absorbent") to regenerate $CO_2$ absorbent (hereinafter referred to as "lean absorbent").

The desulfurization tower 10 includes a desulfurization unit 12 for removing sulfur oxide from gas to be processed at a high level in a bottom portion of the tower with respect to a chimney tray 14 provided in a central area of the tower and a desulfurization gas cooling unit 13 for cooling desulfurization gas which has passed the desulfurization unit at approximately 50° C. or less. This is also called the high-level desulfurization cooling tower. The desulfurization tower 12 further includes a demister 17 which is located nearer a top portion of the cooling tower 13 to remove droplets contained in passing gas.

The desulfurization tower 10 further includes a gas introduction line 11 provided at a bottom portion of the desulfurization unit 12 to introduce gas to be processed into the tower, a cooling fluid circulation line 16 which connects an upper portion of the cooling tower 13 with a lower portion thereof to circulatively supply the cooling fluid accumulated in the chimney tray 14 to the cooling tower 13, a cooling tower 16 for cooling the cooling fluid in the cooling fluid circulation line 16, and a gas exhaust line 18 which is provided on the top portion of the absorption tower 10 to exhaust the desulfurization gas which has passed the desulfurization unit 12 and the cooling unit 13.

Preferably, a desulfurization absorbent for use in the desulfurization unit 12 contains a compound of, for example, calcium carbonate, calcium hydroxide, magnesium hydroxide, sodium hydroxide or a mixture of two or more of the compounds. The concentration of the compound contained in the desulfurization absorbent is preferred to be 0.1 to 30% by weight.

The $CO_2$ absorption tower 20 includes a $CO_2$ absorption unit 21 in a lower portion of the absorption tower 20 and a plurality of washing units 22, 23 in an upper portion of the absorption tower 20. The plurality of the washing units 22, 23 are arranged in series with respect to a flow of desulfurized carbon dioxide gas after $CO_2$ is removed in the $CO_2$ absorption unit in the lower portion. Additionally, the $CO_2$ absorption tower 20 includes chimney trays 24, 25 between the $CO_2$ absorption tower 20 and the plurality of the washing units 22, 23, and further includes a demister 27 for removing droplets contained in passing gas on the side of the top portion of the washing unit 23. A gas introduction line 18 for introducing desulfurized carbon dioxide into the tower is provided below the $CO_2$ absorption unit 21.

The $CO_2$ absorption tower 20 further includes a lean absorbent line 52, which is provided above the $CO_2$ absorption unit 21 to supply $CO_2$ absorbent to the $CO_2$ absorption unit 21, and a rich absorbent line 41, which is provided in the bottom portion of the absorption tower 20 to exhaust the rich absorbent which has absorbed $CO_2$. The $CO_2$ absorption tower 20 further includes washing fluid circulation lines 31, 33 which connect an upper portion of each of the washing units 22, 23 with a lower portion thereof to circulatively supply the washing fluid accumulated in the chimney trays 24, 25 to the washing units 22, 23, and a gas exhaust line 28, which is provided on the top portion of the absorption tower 20 to exhaust the gas which has passed the $CO_2$ absorption unit 21 and the washing units 22, 23. The washing fluid circulation line 31 on the side of the $CO_2$ absorption unit 21 is provided with a cooler 32 configured to cool washing fluid supplied circulatively.

The $CO_2$ absorbent is not limited to any particular type absorbent. However, it is useful to use a $CO_2$ absorbent containing a basic amine compound as a main component thereof. The basic amine compound includes, for example, top-grade amines containing alcoholic hydroxyl, such as monoethanol-amine or 2-amino-2-methyl-1-propanol, second-grade amines containing alcoholic hydroxyl, such as diethanolamine, 2-methyl aminoethanol, or 2-ethylamino ethanol, third-grade amines containing alcoholic hydroxyl, such as triethanolamine, N-methyldiethanolamine, 2-dimethyl aminoethanol, or 2-diethylaminoethanol, polyethylene polyamines, such as ethylenediamine, triethylenediamine, or diethylenetriamine, cyclic amines, such as piperazines, piperidines, or pyrrolidines, polyamines, such as xylylenediamine, or amino acids, such as methylamine carboxylic acid. The $CO_2$ absorbent may contain one or a plurality of the compounds described above. The concentration of the basic amine may be 10-70% by weight. The $CO_2$ absorbent can contain a $CO_2$ absorption accelerator and a corrosion inhibitor. In addition, the $CO_2$ absorbent can include a medium other than those described above, such as methanol, polyethylene glycol, or sulfolane.

The washing fluid circulation line 33 of the washing unit 23 is provided with a washing fluid replenishment line 38 configured to supply fresh washing fluid. The washing fluid used in the washing units 22, 23 is not limited to any particular type of washing fluid. However, it is useful if running water, industrial water or the like is used.

The regeneration tower 40 includes a $CO_2$ desorption unit 42, which is provided in a portion of the regeneration tower 40 from the center to a lower portion thereof. In addition, the regeneration tower 40 includes a washing unit 43, which is provided above the $CO_2$ desorption unit 42 and a chimney tray 44, which is provided below the $CO_2$ desorption unit 42. In the regeneration tower 40, the rich absorbent line 41 for introducing the rich absorbent which has absorbed $CO_2$ in the absorption tower 20 into the regeneration tower 40 is provided between the $CO_2$ desorption unit 42 and the washing unit 43. In addition, in the regeneration tower 40, the lean absorbent line 52 for supplying the regeneration-processed lean absorbent to the $CO_2$ absorption tower 20 is provided in the bottom portion of the regeneration tower 40. Furthermore, in the regeneration tower 40, a heat exchanger 53, which exchanges heat between the rich absorbent line 41 and the lean absorbent line 52, is provided. In addition, a heat exchanger 54, which further recovers heat from the lean absorbent, is provided between the heat exchanger 53 and the $CO_2$ absorption tower 20.

The regeneration tower 40 includes an absorbent regeneration line 45 for extracting a part of the lean absorbent from the bottom portion of the regeneration tower 40 and for supplying the extracted lean absorbent to a portion above the chimney tray 44. The absorbent regeneration line 45 includes a reboiler 46, which heats the lean absorbent. In addition, the regeneration tower 40 includes a $CO_2$ gas exhaust line 47 for exhausting $CO_2$ gas which has been desorbed from the rich absorbent, from the top portion of the regeneration tower 40. The $CO_2$ gas exhaust line 47 includes a condenser 48 which condenses steam entrained in the $CO_2$ gas and a separator drum 49 which separates condensed water, which results from the condensation by the condenser 48 from the gas. The condenser 48 may use cooling water to cool the gas. A condensed water return line 34, which is a line for supplying the separated condensed water as washing fluid for the washing unit 43 of the regeneration tower 40, is provided on the separator drum 49. The condensed water return line 34 is provided with a condensed water return line 35 for supplying a part of the condensed water to the washing units 22, 23 as the washing fluid.

The condensed water transfer line 35 contains a pH meter 37 configured to measure a pH of the condensed water in the same line. The condensed water transfer line 35 is branched to a first branch line 35A, which supplies the condensed water to an upstream side with respect to a flow of decarbonized gas within the $CO_2$ absorption tower 20 or the first washing unit 22 on the side of the bottom of the tower, and a second branch line 35B, which supplies the condensed water to the downstream with respect to the flow of decarbonized gas or the second washing unit 23 on the side of the top portion of the tower. More specifically, the branch lines 35A, 35B are connected to the washing fluid circulation lines 31, 33. In a case in which the cooler 32 is provided on the washing fluid circulation line 31 like in the first washing unit 22, the branch line 35A is connected to an outlet of the cooler 32. The branch lines 35A, 35B are provided with valves 36A, 36B for adjusting the flow rate of the condensed water. In addition, although FIG. 1 illustrates two washing units 22, 23, the present invention is not restricted to this example, and the $CO_2$ absorption tower 20 may include three or more washing units. In this case, the same structure as the first washing unit 22 may be provided repeatedly.

The separator drum 49 is provided with a $CO_2$ gas line 50 configured to supply separated $CO_2$ gas to a $CO_2$ gas pressurization system (not illustrated). The $CO_2$ gas line 50 includes a valve 51 for adjusting the flow rate of $CO_2$ gas. The $CO_2$ gas pressurization system compresses $CO_2$ gas to a predetermined pressure using a plurality of compressors.

With this structure, first, the gas to be processed containing sulfur oxide and carbon dioxide is introduced into the desulfurization tower 10 via the gas introduction line 11. By bringing this gas into contact with desulfurization absorbent and absorbing and removing the sulfur oxide contained in the gas, the desulfurization unit 12 may carry out high-level desulfurization processing so that the concentration of the sulfur oxide is 5 ppm or less, preferably 1 ppm or less. When the concentration of the sulfur oxide in the gas exceeds 5 μm, the sulfur oxide is accumulated in the $CO_2$ absorbent for use in the $CO_2$ absorption tower 20 so that the frequency of reclaiming the $CO_2$ absorbent increases, which is a problem.

The desulfurization gas surpasses the chimney tray 14 and flows into the desulfurization gas cooling unit 13 in the top portion of the desulfurization tower 10. As a result, the temperature of the desulfurization gas is reduced to 50° C. or less, preferably 45° C. or less, more preferably 30 to 45° C. When the temperature of the gas exceeds 50° C., the amount of basic amine which is a main component of the $CO_2$ absorbent accompanied by gas increases so that the basic amine compound is consumed in waste, which is a problem. By installing the high-grade desulfurization cooling apparatus upstream of the gas to be processed in the $CO_2$ absorption tower 20, the $CO_2$ absorption tower 20 may remove $CO_2$ from the gas to be processed and collect the $CO_2$ easily.

Next, the desulfurization gas containing $CO_2$ from the desulfurization tower 10 is introduced into the $CO_2$ absorption tower 20 via the gas exhaust line 18. The $CO_2$ absorbent is supplied to the $CO_2$ absorption tower 20 from the lean absorbent line 52 and the desulfurization gas and the $CO_2$ absorbent are brought into gas-liquid contact with each other in the $CO_2$ absorption unit 21 to absorb and remove $CO_2$ in the desulfurization gas using the $CO_2$ absorbent. After $CO_2$ is removed, the gas flows into the first washing unit 22 across the chimney tray 24. The gas is cleaned with the washing fluid and flows into the second washing unit 23 across the chimney tray 25. After that, the gas is further cleaned. After it is cleaned in the second washing unit 23, the decarbonized gas passes the demister 27 and is exhausted through the gas exhaust line 28 in the top portion of the $CO_2$ absorption tower 20. The washing fluid used in the first and second washing units 22, 23 is accumulated in the chimney trays 24, 25 and never flows down into the $CO_2$ absorption unit 21. The washing fluid accumulated here is circulatively used in the washing units 22, 23 via the washing fluid circulation lines 31, 33.

The rich absorbent which has absorbed $CO_2$ in the $CO_2$ absorption tower 20 is discharged from the bottom portion of the $CO_2$ absorption tower 20 via the rich absorbent line 41, heated by the heat exchanger 53, and then, it is fed to the regeneration tower 40. In the regeneration tower 40, the rich absorbent is diffused into the $CO_2$ desorption unit 42 from the rich absorbent line 41. The rich absorbent flows down in the $CO_2$ desorption unit 42 while at the same time heated. After most $CO_2$ is exhausted, the rich absorbent flows down to the chimney tray 44 near the bottom portion of the regeneration tower 40. The absorbent accumulated in the chimney tray 44 is heated by the reboiler 46 via the absorbent regeneration line 45 and remaining $CO_2$ is exhausted. Then, the absorbent is regenerated and brought back to the bottom portion of the regeneration tower 40. The regenerated lean absorbent is fed via the lean absorbent line 52 on the bottom portion of the regeneration tower 40 and heats the rich absorbent at the heat exchanger 53. After heat is further collected at the heat exchanger 54, the rich absorbent is supplied to the $CO_2$ absorption tower 20.

The $CO_2$ gas which has been desorbed from the rich absorbent passes through the chimney 44 and the $CO_2$ desorption unit 42, ascending to the washing unit 43. In the washing unit 43, washing fluid is diffused from the condensed water return line 34 to remove the $CO_2$ absorbent accompanied by the $CO_2$ gas. The $CO_2$ gas which has been cleaned by the washing unit 43 is exhausted from the $CO_2$ gas exhaust line 47 in the top portion of the regeneration tower 40. Steam entrained in the $CO_2$ gas which has been exhausted from the regeneration tower 40 is condensed by the condenser 48 and the condensed water is separated by the separation drum 49. After the condensed water is removed, the $CO_2$ gas is supplied to the $CO_2$ gas pressurization system (not illustrated) via the $CO_2$ gas line 50, compressed to a predetermined pressure and then collected.

Of the separated condensed water, a part thereof is supplied to the regeneration tower 40 via the condensed water return line 34 and the other part thereof is supplied to the washing fluid circulation lines 31, 33 of the washing units 22, 23 via the condensed water transfer line 35 and reused. The condensed water which passes through the condensed water transfer line 35 is measured in pH by the pH meter 37. When the measured pH value is higher than a first threshold, a valve 36 is opened/closed to supply the condensed water to the first washing unit 22, and when the measured pH value is lower than the first threshold, the valve 36 is opened/closed to supply the condensed water to the second washing unit 23. In this case, from the viewpoint of maintaining cleaning effect in the washing unit, the first threshold is preferred to be 6 to 10 and more preferred to be 7 to 9.

When an operating condition of the regeneration tower 40 is unstable at the startup time or stop time of the system, the concentration of basic amine of condensed water obtained from the separator drum 49 may change. When condensed water having a high concentration of the basic amine is supplied to the second washing unit 23 in the top portion of the $CO_2$ absorption tower 20, the amount of basic amine compound accompanied by gas exhausted from the gas exhaust line 28 increases, so that a diffused amount of basic amine compound increases. Thus, when the pH value of washing fluid in the condensed water transfer line 35 is higher than the first threshold as described above or the concentration of basic amine compound is high, the condensed water is supplied to the first washing unit 22 far from the gas exhaust line 28 in the top portion of the $CO_2$ absorption tower 20 to suppress the diffused amount of the basic amine compound.

Figure 2:
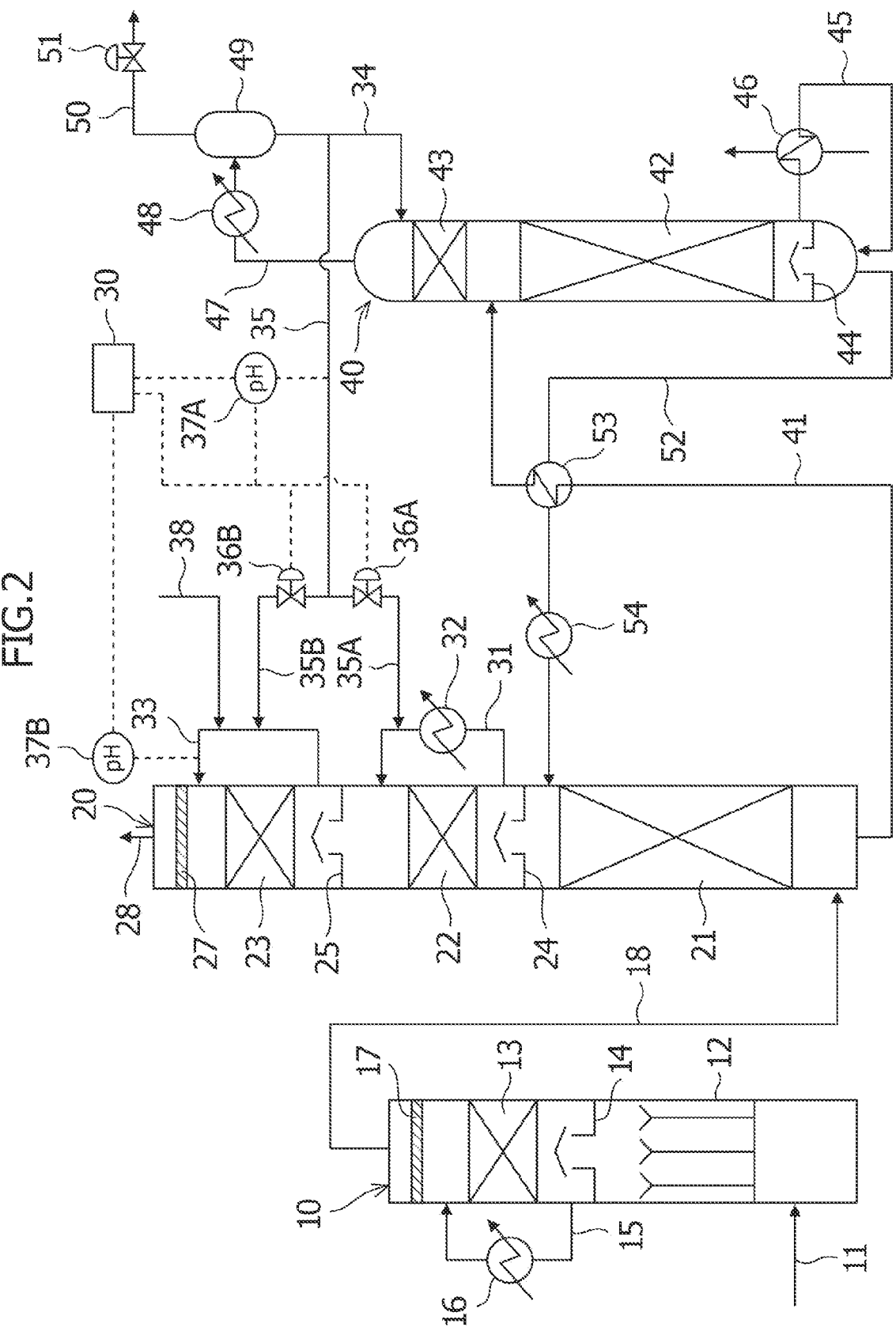
FIG. 2 is a diagram schematically illustrating an improvement of the exemplary embodiment illustrated in FIG. 1.

FIG. 2 illustrates an improvement of the embodiment illustrated in FIG. 1. Like reference numerals are attached to the same components as the embodiment of FIG. 1 and description of those components is omitted.

As illustrated in FIG. 2, a pH meter 37A for measuring pH of condensed water in the condensed water transfer line 35 is provided on the condensed water transfer line 35 from the regeneration tower 40. The cleaning water circulation line 33 of the second washing unit 23 in the $CO_2$ absorption tower 20 is provided with a pH meter 37B for measuring pH of washing fluid flowing through the condensed water transfer line 35. The pH meters 37A, 37B are connected to the control unit 30 which controls the flow rate of each of the valves 36A, 36B according to pH values measured by the pH meters 37A, 27B so that the pH meters 37A, 37B are capable of communicating with the control unit 30.

With such a structure, of condensed water separated by the separator tank 49, a part thereof is supplied to the regeneration tower 40 via the condensed water return line 34, where the condensed water is reused. A part of the condensed water is supplied to the first and second washing units 22, 23 via the condensed water transfer line 35, where the condensed water is reused. Condensed water passing through the condensed water transfer line 35 is measured in pH by the pH meter 37A. Then, based on the pH values measured by the pH meters 37A, 37B, the control unit 30 opens/closes the valves 36A, 36B provided in the first and second branch lines 35A, 35B of the condensed water transfer line 35. More specifically, assuming that the pH value of condensed water in the condensed water transfer line 35 which the pH meter 37A measures is pH1 and that the pH value of washing fluid in the washing fluid circulation line 33 of the second washing unit 23 which the pH meter 37B measures is pH2, when pH1/pH2 exceeds the first threshold of 1 (that is, pH1/pH2>1), the control unit 30 opens the valve 36A and closes the valves 36B to supply the condensed water to the first washing unit 22 located on the side of the bottom portion of the $CO_2$ absorption tower 20. On the other hand, when the pH1/pH2 is less than the first threshold or pH/pH<1, the control unit 30 closes the valve 36A and opens the valve 36B to supply the condensed water to the second washing unit 23 located on the side of the top portion of the $CO_2$ absorption tower 20.

When with respect to the pH value (pH2) of washing fluid in the washing fluid circulation line 33 of the second washing unit 23, the pH value (pH1) of condensed water in the condensed water transfer line 35 is high, that is, the concentration of basic amine compound is high, the diffused amount of the basic amine compound can be suppressed by supplying the condensed water to the first washing unit 22 located far from the gas exhaust line 28 in the top portion of the $CO_2$ absorption tower 20.

Although the case of controlling the pH value with respect to pH1/pH2=1 has been described, the first threshold of pH1/pH2 is not restricted to 1, but may be set in a range of 0.9 to 1.

Figure 3:
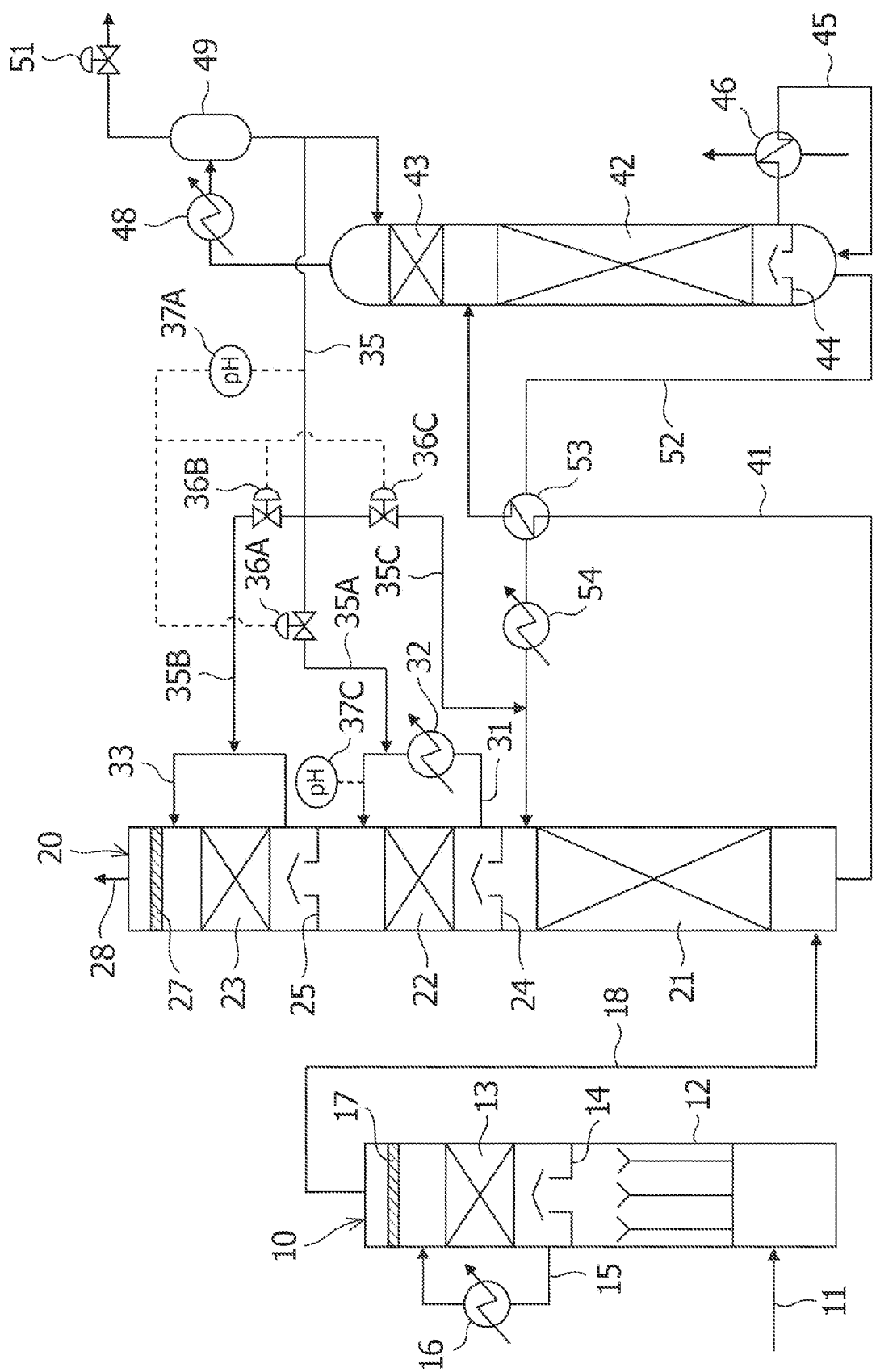
FIG. 3 is a diagram schematically illustrating a $CO_2$ recovery system according to another exemplary embodiment of the present invention.

FIG. 3 illustrates another exemplary embodiment of the $CO_2$ recovery system of the present invention. Like reference numerals are attached to the same components as the exemplary embodiment of FIG. 1 and description of those components is omitted.

As illustrated in FIG. 3, the condensed water transfer line 35 is branched to a first branch line 35A which supplies condensed water to the washing fluid circulation line 31 of the first washing unit 22, the second branch line 35B which supplies condensed water to the washing fluid circulation line 33 of the second washing unit 23, and a third branch line 35C which supplies condensed water to the rich absorbent line 41 of the $CO_2$ absorption unit 21. The respective branch lines 35A, 35B, 35C are provided with valves 36A, 36B, 36C for adjusting the flow rate of the condensed water.

With such a structure, of condensed water separated by the separator tank 49, a part thereof is supplied to the regeneration tower 40 via the condensed water return line 34, where the condensed water is reused. A part of the condensed water is supplied to the first and second washing units 22, 23 and the $CO_2$ absorption unit 21 via the condensed water transfer line 35, where the condensed water is reused. Condensed water passing through the condensed water transfer line 35 is measured in pH by the pH meter 37. When the measured pH value is higher than the first threshold and the second threshold, the valve 36 is opened/closed to supply the condensed water to the $CO_2$ absorption unit 21. When the measured pH value is higher than the first threshold and lower than the second threshold, the valve 36 is opened/closed to supply the condensed water to the first washing unit 22. When the measured pH value is lower than the first threshold and the second threshold, the valve 36 is opened/closed to supply the condensed water to the second washing unit 23. In this case, the first threshold may be in the same range as described above, and in viewpoints of maintaining cleaning effect in the washing unit, the second threshold is preferred to be in a range of 9 to 11, and more preferred to be in a range of 10 to 11.

Figure 4:
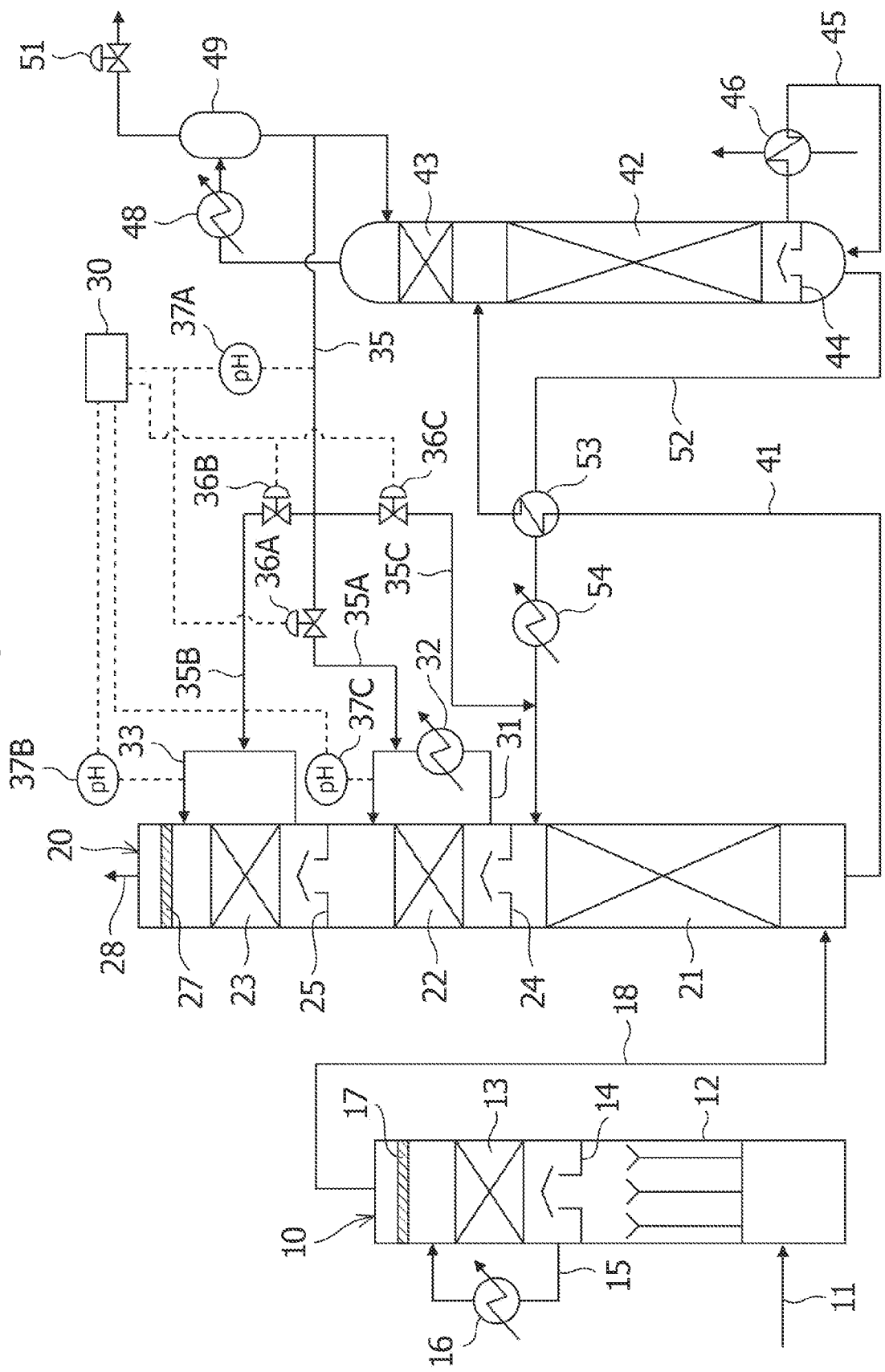
FIG. 4 is a diagram schematically illustrating an improvement example of the exemplary embodiment illustrated in FIG. 2.

FIG. 4 illustrates an improvement of the exemplary embodiment illustrated in FIG. 3. Like reference numerals are attached to the same components as the exemplary embodiment of FIG. 3 and description thereof is omitted.

As illustrated in FIG. 4, a pH meter 37A for measuring pH of condensed water in the condensed water transfer line 35 is provided in the condensed water transfer line 35 from the regeneration tower 40. The pH meter 37B for measuring the pH of washing fluid flowing through the washing fluid circulation line 33 is provided in the washing fluid circulation line 33 of the second washing unit 23 in the $CO_2$ absorption tower 20. In the washing fluid circulation line 31 of the first washing unit 22, a pH meter 37C for measuring the pH of condensed water in the first branch line 35A is provided downstream of the first branch line 35A. The valves 36A to 36C and the pH meters 37A to 37C are connected to the control unit 30 which controls the flow rate of the valves 36A to 36C based on the pH values measured by the pH meters 37A to 37C.

With such a structure, of condensed water separated by the separator tank 49, a part thereof is supplied to the regeneration tower 40 via the condensed water return line 34, where the condensed water is reused. A part of the separated condensed water is supplied to the first, second washing units 22, 23 and the $CO_2$ absorption tower 21 via the condensed water transfer line 35, where the condensed water is reused. The condensed water which passes the condensed water transfer line 35 is measured in pH by the pH meter 37A. The pH of the cleaning water flowing through the cleaning water circulation lines 31, 33 of the first, second washing units 22, 23 is measured by the pH meters 37C, 37B. Based on the pH values measured by the pH meters 37A to 37C, the control unit 30 opens/closes the valves 36A to 36C provided on the first, second and third branch lines 35A to 35C of the condensed water transfer line 35.

More specifically, assuming that the pH value of condensed water in the condensed water transfer line 35 which the pH meter 37A measures is pH1 and that the pH value of washing fluid in the washing fluid circulation line 33 of the second washing unit 23 which the pH meter 37B measures is pH2, and that the pH value of cleaning water in the cleaning water circulation line 31 of the first washing unit 22 which the pH meter 37C measures is pH3, when pH1/pH3>1, the control unit 30 closes the valves 36A, 36B and opens the valve 36C to supply the condensed water to the $CO_2$ absorption tower 21. Further, when pH/pH<1 and pH1/pH>1, the control unit 30 opens the valve 36A and closes the valve 36B, 36C to supply the condensed water to the first washing unit 22 located on the side of the bottom portion of the $CO_2$ absorption tower 20. When pH1/pH2<1, the control unit 30 closes the valves 36A, 36C and opens the valve 36B to supply the condensed water to the second washing unit 23 located on the side of the top portion of the $CO_2$ absorption tower 20. Under such a control, even when the pH value of the condensed water is extremely high, the diffused amount of basic amine compound from the gas exhaust line 28 located on the top portion of the $CO_2$ absorption tower 20 can be suppressed.

Although a case of controlling the pH value with respect to pH1/pH2=1 and pH1/pH=1 has been described, the first threshold of pH1/pH2 is not restricted to 1, but may be set in a range of 0.9 to 1 and the second threshold of pH1/pH3 is not restricted to 1, but may be set in a range of 0.9 to 1.

Although FIGS. 1 to 4 express the pH meter 37, the present invention is not restricted to this example as long as the meter is capable of monitoring changes in concentration of the basic amine compound in the condensed water, that is, $CO_2$ absorbent, but it is permissible to install an electric conductivity meter or a resistivity meter instead of the pH meter.

The preferred embodiments of the present invention have been described above. However, it is not intended to restrict the scope of the present invention to any particular exemplary embodiments described previously, but a variety of modifications, improvements or equivalent examples of the present invention may be carried out without departing from the spirit and scope of the present invention specified by accompanying claims.

What is claimed is:

1. A system for recovering $CO_2$ from gas to be processed containing $CO_2$, comprising:
   a $CO_2$ absorption apparatus having an absorption unit that brings the gas to be processed containing $CO_2$ into contact with $CO_2$ absorbent to absorb and remove $CO_2$ from the gas to be processed;
   a regeneration apparatus configured to heat the absorbent that has absorbed $CO_2$, separates and removes $CO_2$ from the absorbent, exhausts $CO_2$ and regenerates the absorbent;
   a condensation apparatus configured to cool $CO_2$ gas exhausted from the regeneration apparatus to condense moisture in the gas; and
   a condensed water distribution apparatus configured to monitor changes in concentration of the $CO_2$ absorbent in the condensed water obtained by the condensation apparatus and depending on the value of a measured concentration, supply the condensed water as a part of washing fluid of the washing unit in the $CO_2$ absorption apparatus or a part of the $CO_2$ absorbent of the absorption unit.

2. The system according to claim 1, wherein the apparatus configured to monitor changes in concentration of the $CO_2$ absorbent in the condensed water is a pH meter, an electric conductivity meter or a resistivity meter.

3. The apparatus according to claim 1, wherein the $CO_2$ absorption apparatus contains a plurality of the washing units arranged in series for the treated gas from which $CO_2$ has been removed by the absorption unit, and
   wherein the condensed water distribution apparatus, when the measured value is higher than a first threshold, supplies condensed water to a washing unit located upstream with respect to a flow of the treated gas, of the plurality of the washing units, and when the measured value is lower than the first threshold, supplies condensed water to the washing unit located downstream.

4. The apparatus according to claim 1, wherein the $CO_2$ absorption apparatus contains a plurality of the washing units arranged in series for the treated gas from which $CO_2$ has been removed by the absorption unit, and
   wherein the condensed water distribution apparatus, when the measured value is higher than a first threshold and a second threshold, supplies condensed water to the absorption unit, and when the measured value is higher than the first threshold and lower than the second threshold, supplies condensed water to a washing unit located upstream with respect to a flow of the treated gas of the plurality of the washing units, and when the measured value is lower than the first threshold and the second threshold, supplies condensed water to a washing unit located downstream.

5. The apparatus according to claim 1, wherein the $CO_2$ absorption apparatus contains a plurality of the washing units arranged in series for the treated gas from which $CO_2$ has been removed by the absorption unit, and wherein the condensed water distribution apparatus monitors changes in concentration of the $CO_2$ absorbent contained in the washing fluid supplied to the washing unit located downstream with respect to the flow of the treated gas, and when a ratio of the value of a concentration measured with condensed water obtained in the condensation apparatus with respect to the value of a concentration measured with washing fluid of a washing unit located downstream is lower than the first threshold, supplies condensed water to a washing unit located downstream of the plurality of the washing units, and when the ratio is higher than the first threshold, supplies condensed water to the washing unit located upstream.

6. The apparatus according to claim 1, wherein the $CO_2$ absorption apparatus contains a plurality of the washing units arranged in series for the treated gas from which $CO_2$ has been removed by the absorption unit, and wherein the condensed water distribution apparatus monitors changes in concentration of the $CO_2$ absorbent contained in the washing fluid supplied to the washing units located upstream and downstream with respect to the flow of the treated gas, when a ratio of the value of a concentration measured with condensed water obtained in the condensation apparatus with respect to the value of a concentration measured with washing fluid of a washing unit located downstream is lower than the first threshold, supplies condensed water to a washing unit located downstream of the plurality of the washing units, when the ratio is higher than the first threshold and a ratio of concentration measured with condensed water obtained in the condensation apparatus with respect to the value of concentration measured with washing fluid of the washing unit located upstream is lower than the second threshold, supplies condensed water to the washing unit located downstream of the plurality of the washing units, when the latter ratio is higher than the second threshold, supplies condensed water to the absorption unit.

7. A method for recovering $CO_2$ from gas to be processed containing $CO_2$, comprising: the steps of bringing the gas to be processed containing $CO_2$ and $CO_2$ absorbent into contact with each other to absorb and remove $CO_2$ from the gas to be processed;

cleaning the treated gas from which $CO_2$ has been removed with washing fluid at least once;

heating the absorbent which has absorbed $CO_2$, separating and removing $CO_2$ gas from the absorbent and regenerating the absorbent;

cooling the separated $CO_2$ gas to condense moisture contained in the gas to obtain condensed water; and monitoring a concentration of the $CO_2$ absorbent contained in the condensed water and depending on the value of the measured concentration, controlling supply of the condensed water so that the condensed water is reused as a part of the washing fluid or a part of the $CO_2$ absorbent.

8. The method according to claim 7 further comprising a step of measuring pH, electric conductivity or resistivity of the condensed water to monitor changes in concentration of the $CO_2$ absorbent contained in the condensed water.

9. The method according to claim 7, wherein the step of cleaning the treated gas includes cleaning the treated gas with washing fluid multiple times, and wherein the control step includes, when the measured value is higher than the first threshold, supplying condensed water so that the condensed water is reused as a part of washing fluid for cleaning on an upstream side with respect to the flow of the treated gas of the plurality of the cleanings, and when the measured value is lower than the first threshold, supplying the condensed water so that the condensed water is reused as a part of cleaning water for cleaning on the downstream side.

10. The method according to claim 7, wherein the step of cleaning the treated gas includes cleaning the treated gas with washing fluid multiple times, and wherein the control step includes: when the measured value is higher than the first threshold and the second threshold, supplying the condensed water so that the condensed water is reused as a part of the absorbent;

when the measured value is higher than the first threshold and lower than the second threshold, supplying the condensed water so that the condensed water is reused as a part of washing fluid for cleaning on an upstream side with respect to the flow of the treated gas of the plurality of the cleaning; and when the measured value is lower than the first and second thresholds, supplying the condensed water as a part of the washing fluid on the downstream side.

11. The method according to claim 7, wherein the step of cleaning the treated gas includes cleaning the treated gas with washing fluid multiple times, and wherein the control step further includes: monitoring the concentration of the $CO_2$ absorbent contained in washing fluid for cleaning the treated gas on the downstream side with respect to a flow of the treated gas of the plurality of the cleaning;

when a ratio of a concentration measured with condensed water with respect to the value of a concentration measured with washing fluid for cleaning the treated gas on the downstream side is lower than the first threshold, supplying the condensed water so that the condensed water is reused as a part of the washing fluid for cleaning the treated gas on the downstream side of the plurality of the cleanings; and when the ratio is higher than the first threshold, supplying the condensed water so that the condensed water is reused as a part of the washing fluid for cleaning the treated gas on an upstream side.

12. The method according to claim 7, wherein the step of cleaning the treated gas includes cleaning the treated gas with washing fluid multiple times, and wherein the control step further includes: monitoring the concentration of the $CO_2$ absorbent in the washing fluid for the plurality of the cleanings;

when a ratio of a concentration measured with condensed water with respect to the value of a concentration measured with washing fluid for cleaning the treated gas on the downstream side is lower than the first threshold, supplying the condensed water so that the condensed water is reused as a part of washing fluid for cleaning the treated gas on the downstream side;

when the ratio is higher than the first threshold and a ratio of the value of a concentration measured with condensed water with respect to the value of a concentration measured with cleaning water for cleaning the treated gas on an upstream side is lower than the second threshold, supplying the condensed water as a part of washing fluid for cleaning the treated gas on an upstream side; and when the latter ratio is higher than the second threshold, supplying the condensed water so that the condensed water is reused as a part of the absorbent.

\* \* \* \* \*